United States Patent
Tunks et al.

(10) Patent No.: US 11,249,525 B1
(45) Date of Patent: Feb. 15, 2022

(54) CONTROLLING AN OPERATING TEMPERATURE OF A PROCESSOR TO REDUCE POWER USAGE AT AN INFORMATION HANDLING SYSTEM

(71) Applicant: Dell Products L.P., Round Rock, TX (US)

(72) Inventors: Eric Michael Tunks, Austin, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/126,205

(22) Filed: Dec. 18, 2020

(51) Int. Cl.
*G06F 1/20* (2006.01)
*G06F 1/32* (2019.01)
*G06F 9/38* (2018.01)
*G06F 1/3203* (2019.01)

(52) U.S. Cl.
CPC ............ *G06F 1/206* (2013.01); *G06F 1/3203* (2013.01); *G06F 9/3836* (2013.01)

(58) Field of Classification Search
CPC ................................ G06F 1/206; G06F 1/3203
See application file for complete search history.

(56) References Cited

U.S. PATENT DOCUMENTS

| | | | | |
|---|---|---|---|---|
| 2004/0003301 A1* | 1/2004 | Nguyen | ............... | G06F 1/28 713/300 |
| 2005/0052196 A1* | 3/2005 | Borkar | ............... | H01L 23/34 324/750.03 |
| 2005/0149772 A1* | 7/2005 | Chung | ............... | G06F 1/206 713/320 |
| 2010/0083018 A1* | 4/2010 | Park | ............... | G06F 1/3206 713/320 |
| 2012/0159216 A1* | 6/2012 | Wells | ............... | G06F 1/3206 713/322 |
| 2013/0197895 A1* | 8/2013 | Wang | ............... | G06F 1/206 703/21 |
| 2016/0224465 A1* | 8/2016 | Morad | ............... | G06F 15/167 |

\* cited by examiner

*Primary Examiner* — Mark A Connolly
(74) *Attorney, Agent, or Firm* — Baker Botts L.L.P.

(57) ABSTRACT

A method and system to control an operating temperature of a processor of an information handling system, including executing a workload by the processor at the information handling system; in response to execution of the workload, determining that the processor is in a steady-state condition; in response to determining that the processor is in the steady-state condition: increasing a cooling parameter of a cooling module of the information handling system to decrease a temperature of the processor; determining, based on the decreased temperature of the processor, whether a power used by the processor has decreased; and when the power used by the processor has decreased, iteratively increasing the cooling parameter of the cooling module until the power of the processor stops decreasing to identify the operating temperature of the processor where the processor is operating at a minimal power.

20 Claims, 7 Drawing Sheets

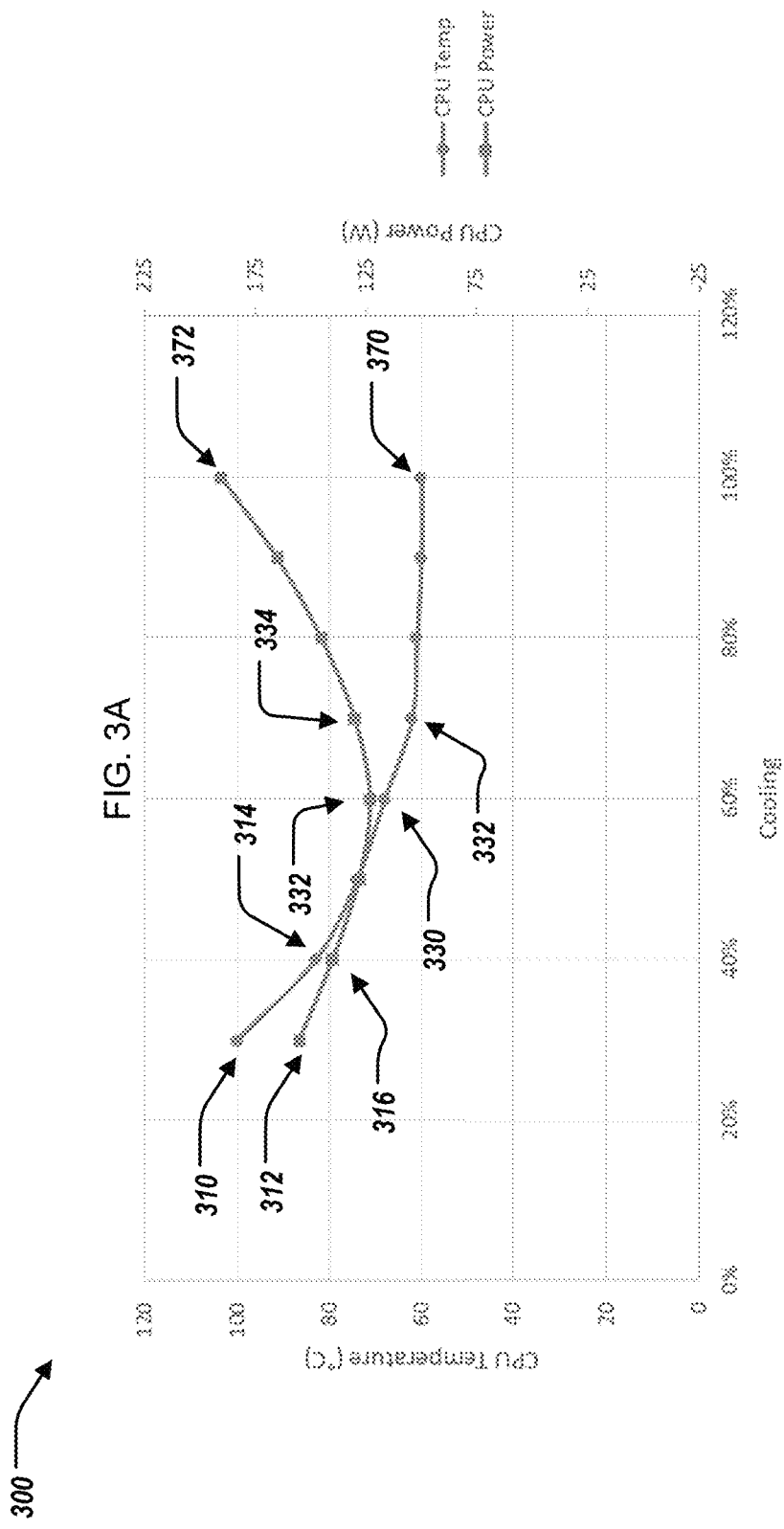

| Cooling Steps | CPU Temp | CPU Power |
|---|---|---|
| 100% | 60 | 190 |
| 90% | 60 | 165 |
| 80% | 61 | 145 |
| 70% | 62 | 130 |
| 60% | 68 | 123 |
| 50% | 74 | 128 |
| 40% | 83 | 140 |
| 30% | 100 | 155 |

CONTROLLING AN OPERATING TEMPERATURE OF A PROCESSOR TO REDUCE POWER USAGE AT AN INFORMATION HANDLING SYSTEM

BACKGROUND

Field of the Disclosure

The disclosure relates generally to an information handling system, and in particular, controlling an operating temperature of a processor to reduce power usage at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in method for controlling an operating temperature of a processor, including executing a workload by the processor at the information handling system; in response to execution of the workload, determining that the processor is in a steady-state condition; in response to determining that the processor is in the steady-state condition: increasing a cooling parameter of a cooling module of the information handling system to decrease a temperature of the processor; determining, based on the decreased temperature of the processor, whether a power used by the processor has decreased; and when the power used by the processor has decreased, iteratively increasing the cooling parameter of the cooling module until the power of the processor stops decreasing to identify the operating temperature of the processor where the processor is operating at a minimal power.

Other embodiments of these aspects include corresponding systems, apparatus, and computer programs, configured to perform the actions of the methods, encoded on computer storage devices.

These and other embodiments may each optionally include one or more of the following features. For instance, increasing the cooling parameter of the cooling module includes increasing a fan speed of an air cooled cooling module. Increasing the cooling parameter of the cooling module includes increasing a flow rate of a liquid of a liquid cooled cooling module. Executing the workload includes setting one or more parameters of the processor, the parameters including a processor power, a processor power utilization, a processor operating frequency, and a processor workload type. Setting the operating temperature of the processor when the processor is operating at the minimal power. Determining that the processor is in the steady-state condition includes identifying a steady-state temperature of the processor and a steady-state power of the processor. In response to execution of the workload, determining that the cooling module is in a steady state condition. In response to determining that the processor is in the steady-state condition: increasing a cooling parameter of the cooling module to decrease a temperature of the processor; determining, based on the decreased temperature of the processor, whether the power used by the information handling system has decreased; and when the power used by the information handling system has decreased, iteratively increasing the cooling parameter of the cooling module until the power of the information handling stops decreasing to identify an operating temperature of the information handling system where the information handling system is operating at a minimal power. The power of the information handling system includes the power of the processor and a power of the cooling module.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A, 3B illustrates a graph and table, respectively, illustrating a relationship between values of a cooling parameter and a temperature of a processor.

DESCRIPTION OF PARTICULAR EMBODIMENT(S)

Figure 1:
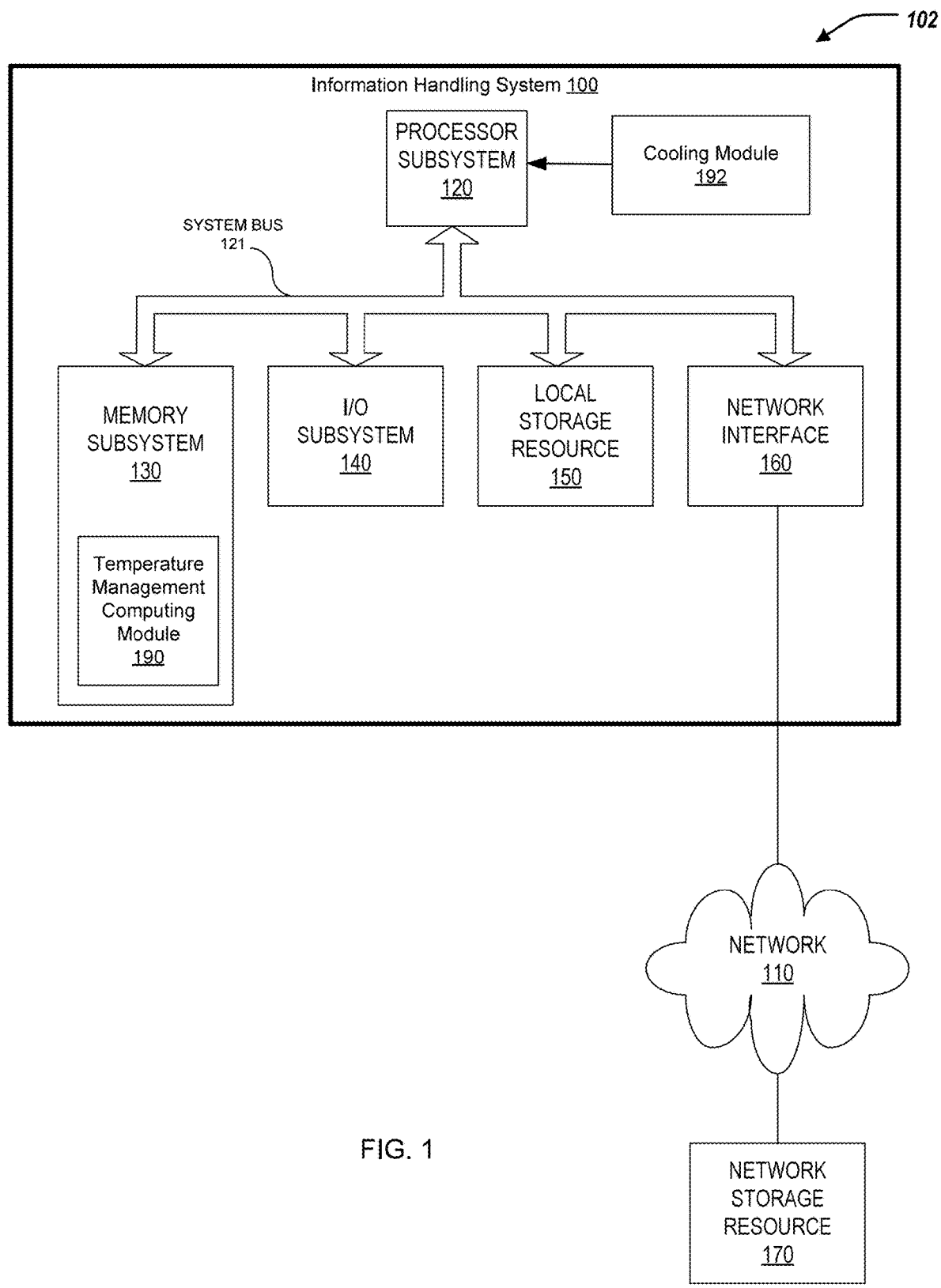
FIG. 1 is a block diagram of selected elements of an embodiment of a computing environment.

This disclosure discusses methods and systems for controlling an optimal temperature to reduce power usage at the information handling system. In short, a power at which a processor can operate can be dependent upon a temperature of the processor. An optimal operating temperature of the processor can be identified such that power used by the processor is minimized (while maintaining a desired performance level). That is, as the operating temperature of the processor deviates from this "optimal" operating temperature (where the power of the processor is minimized), the processor can operate at a higher (elevated) power but with no increase in performance of the processor. That is, the processor is experiencing "wasted" power that is not contributing to performance increases of the processor as the temperature of the process deviates from this optimal operating temperature. In response, a cooling module can provide appropriate cooling to the processor such that the optimal temperature of the processor is achieved, described further herein.

Specifically, this disclosure discusses a system and a method of controlling an operating temperature of a processor of an information handling system, including executing a workload by the processor at the information handling system; in response to execution of the workload, determining that the processor is in a steady-state condition; in response to determining that the processor is in the steady-state condition: increasing a cooling parameter of a cooling module of the information handling system to decrease a temperature of the processor; determining, based on the decreased temperature of the processor, whether a power used by the processor has decreased; and when the power of the processor has decreased, iteratively increasing the cooling parameter of the cooling module until the power used by the processor stops decreasing to identify the operating temperature of the processor where the processor is operating at a minimal power.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a temperature management computing module 190. The temperature management computing module 190 can be included by the memory subsystem 130. The temperature management computing module 190 can include a computer-executable program (software).

The information handling system 100 can further include a cooling module 192. For example, the cooling module 192 can include an air-based cooling system (fan) or a liquid-based cooling system. The cooling module 192 can provide cooling to the processor subsystem 120.

In short, the information handling system 100 may provide temperature control of the processor subsystem 120 (and/or the information handling system 100 itself) to minimize an operating power of the processor subsystem 120. Specifically, the power at which the processor subsystem 120 can operate can be dependent upon the temperature of the processor subsystem 120. The temperature management computing module 190 can identify an optimal operating temperature of the processor subsystem 120 such that power used by the processor subsystem 120 is minimized (while maintaining a desired performance level). That is, as the operating temperature of the processor subsystem 120 deviates from this "optimal" operating temperature (where the power of the processor subsystem 120 is minimized), the processor subsystem 120 can operate at a higher (elevated) power but with no increase in performance of the processor subsystem 120. That is, the processor subsystem 120 is experiencing "wasted" power that is not contributing to performance increases of the processor subsystem 120 as the temperature of the process subsystem 120 deviates from this optimal operating temperature. For example, the wasted power can include fan power, voltage regulator power losses, and power supply inefficiencies.

The temperature management computing module 190 can communicate this optimal operating temperature to the cooling module 192 such that the cooling module 192 can provide appropriate cooling to the processor subsystem 120 such that the optimal temperature of the processor subsystem 120 is achieved, described further herein.

In general, the temperature management computing module 190 can perform i) an on-demand, run-time test holding the processing subsystem 120 at a constant stress and varying cooling of the processor subsystem 120 (by the cooling module 192); ii) monitoring the processor subsystem 120 power in response to the varied cooling; iii) and utilizing the results to identify the optimized operating temperature of the processor subsystem 120 where the power of the processor subsystem 120 is minimized (while maintaining a desired performance level). The temperature management computing module 120 can set this optimal temperature as the closed loop temperature target of the processor subsystem 120 for thermal control.

Figure 2:
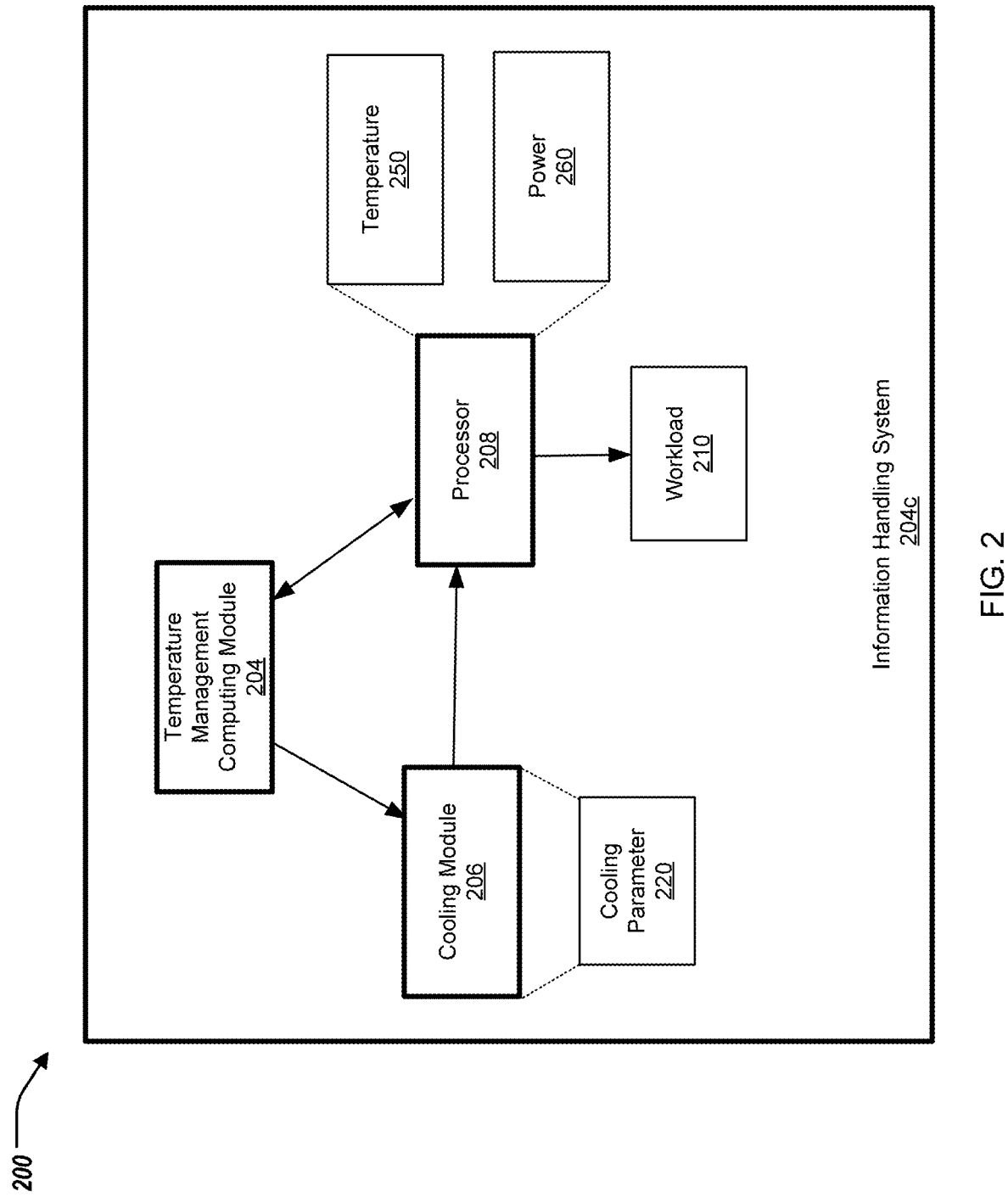
FIG. 2 illustrates a block diagram of a computing environment for controlling an operating temperature of a processor to reduce power usage at the information handling system.

Turning to FIG. 2, FIG. 2 illustrates an environment 200 including an information handling system 202. The information handling system 202 can include a temperature management computing module 204, a cooling module 206, and a processor 208 (or processors 208). The temperature management computing module 204 can be in communication with the cooling module 206 and the processor 208. The cooling module 206 can be in communication with the processor 208. The temperature management computing module 204 can be the same as, or substantially similar to, the temperature management computing module 190 of FIG. 1. The cooling module 206 can be the same as, or substantially similar to, the cooling module 192 of FIG. 1. The information handling system 202 can be the same as, or substantially similar to, the information handling system 102 of FIG. 1.

In some examples, the cooling module 206 can include an air-cooled cooling module (e.g., a fan cooling module). In some examples, the cooling module 206 can include a liquid-cooled cooling module The processor 208 can execute a workload 210. In some examples, the workload 210 can be an existing workload that is typically executed by the processor 208. In some examples, the workload 210 can be a characteristic workload representing a processing scenario (simulation).

In some examples, executing the workload 210 can include setting parameters of the processor 208. The parameters of the processor 208 can be set to match (or substantially match) an expected usage, or workload, at the processor 208. For example, the parameters can include a processor power. That is, the processor power can be heat that is generated by the processor 208 in response to the workload 210 (e.g., thermal design power or TDP). For example, the parameters can include a processor power utilization. That is, the utilization of the maximum power of the processor 208 in response to the workload 210. For example, the parameters can include an operating frequency of the processor 208. That is, the processing speed of the processor 208 (performance level). For example, the parameters can include a workload type. That is, the workload type can be computational work performed by the processor 208. The type of workload can include processor intensive, memory intensive, or input/output intensive. The type of workload can vary from computational intense workloads (mathematical equation solving for machine learning process) to lighter computational workloads (traffic directing).

The temperature management computing module 204 can, in response to execution of the workload 210 by the processor 208, determine whether the processor 208 is in a steady-state condition. Specifically, the temperature management computing module 204 can determine whether the processor 208 is in the steady-state condition by evaluating a temperature 250 and a power 260 of the processor 208. The temperature management computing module 204 can determine that the processor 208 is in the steady-state condition when the deviation of the values of the temperature 250 and the power 260 of the processor 208 over a time period are within a threshold (margin). That is, when the change in the values of the temperature 250 and the power 260 of the processor 208 are within a threshold (e.g., less than the threshold) over a time period, the temperature management computing module 204 determines that the processor 208 is in a steady state condition.

In some examples, the temperature management computing module 204 can determine whether the cooling module 206 is in a steady-state condition. Specifically, the temperature management computing module 204 can determine whether the cooling module 206 is in the steady-state condition by evaluating a cooling parameter 220 of the cooling module 206.

For example, when the cooling module 206 includes an air-cooled cooling module 206, the cooling parameter 220 can include a fan speed. The temperature management computing module 204 can determine that the cooling module 206 is in the steady-state condition when the deviation of the values of the fan speed over a time period are within a threshold (margin). That is, when the change in the values of the fan speed of the cooling module 206 are within a threshold (e.g., less than the threshold) over a time period, the temperature management computing module 204 determines that the cooling module 206 is in a steady state condition.

For example, when the cooling module 206 includes a water-cooled cooling module 206, the cooling parameter 220 can include a flow rate of liquid. The temperature management computing module 204 can determine that the cooling module 206 is in the steady-state condition when the deviation of the values of the flow rate of the liquid over a time period are within a threshold (margin). That is, when the change in the values of the flow rate of the liquid of the cooling module 206 are within a threshold (e.g., less than the threshold) over a time period, the temperature management computing module 204 determines that the cooling module 206 is in a steady state condition.

The temperature management computing module 204, in response to determining that the processor 208 is in the steady-state condition, can increase the cooling parameter 220 of the cooling module 206 to decrease the temperature 250 of the processor 208. Specifically, the temperature 250 of the processor 208 is dependent upon (or based upon) the value of the cooling parameter 220 of the cooling module 206.

FIG. 3A illustrates a graph 300 illustrating a relationship between the values of the cooling parameter 220 and the temperature 250 of the processor 208. Specifically, the x-axis illustrates the values of the cooling parameter 220 (e.g., from 0-100% cooling), with the y-axis representing both the processor temperature 250 (Celsius), shown by line 370, and the processor power 260 (watts), shown by line 372. FIG. 3B illustrates a table 350 showing the values based on the graph 300, for each cooling percentage (e.g., 100%, 90%, etc.), the processor temperature 250 (Celsius) and the processor power 260 (watts).

To that end, in some examples, as the cooling module 206 increases the cooling parameter 220, the temperature of the processor 208 is decreased. For example, at a cooling parameter 220 of 30% (e.g., 30% of maximum cooling), the temperature 250 of the processor 208 is 100 degrees Celsius (at point 310) and the power 260 of the processor 208 is 155 watts (at point 312). Continuing, at a cooling parameter 220 of 40% (e.g., 40% of maximum cooling), the temperature 250 of the processor 208 is 83 degrees Celsius (at point 314) and the power 260 of the processor 208 is 140 watts (at point 316).

Further in response to determining that the processor 208 is in the steady-state condition, the temperature management computing module 204 can determine, based on the decreased temperature 250 of the processor 208, whether the power 260 used by the processor 208 has decreased. For example, the temperature management computing module 204 can identify that the temperature 250 has decreased from 100 degrees Celsius (at point 310) to 83 degrees (at point 314) when the cooling parameter is increased from 30% to 40%. Further, the temperature management computing module 204 can further identify that correspondingly, the power 260 has decreased from 155 watts (at point 312) to 140 watts (at point 316).

Further in response to determining that the processor 208 is in the steady-state condition, the temperature management computing module 204, when the power 260 used by the processor 208 has decreased, iteratively increases the cooling parameter 220 of the cooling module 206 until the power 260 used by the processor 208 stops decreasing to identify the operating temperature of the processor 208 where the processor 208 is operating at a minimal power. For example, at a cooling parameter 220 of 60% (e.g., 60% of maximum cooling), the temperature 250 of the processor 208 is 68 degrees Celsius (at point 330) and the power 260 of the processor 208 is 123 watts (at point 332). Continuing, at a cooling parameter 220 of 70% (e.g., 70% of maximum cooling), the temperature 250 of the processor 208 is 62 degrees Celsius (at point 334) and the power 260 of the processor 208 is 130 watts (at point 336).

To that end, the temperature management computing module 204 can determine that the power 260 used by the processor 208 has stopped decreasing with an increase in the cooling parameter 220. Specifically, as the cooling parameter has increased from 60% to 70%, the power 260 of the processor 208 has increased from 123 watts (at point 332) to 130 watts (at point 334) (while concurrently the temperature 250 of the processor 208 had decreased from 68 degrees Celsius (at point 330) to 62 degrees Celsius (at point 332)).

Thus, the temperature management computing module 204 can identify the operating temperature 250 of the processor 208 where the processor 208 is operating the minimal power. For example, the temperature management computing module 204 can identify the operating temperature 250 of the processor as 68 degrees Celsius (at point 330) as this is where the processor 208 is at the minimal power (123 watts at point 332)—e.g., an inflection point. Increasing or decreasing the cooling parameter from 60% by the cooling module 206 will result in an increase in power 260 at the processor 208. In other words, providing further cooling by the cooling module 206 (the cooling parameter 220) to decrease the temperature 250 of the processor 208 does not result in further reduction in power 260 used by the processor 208—rather, increasing the cooling by the cooling module 206 past the "inflection" point increases the power 260 of the processor 208. The inflection point being the minimal power 260 of the processor 208.

In some examples, when the cooling module 206 includes an air-cooled cooling module, the cooling module 206 can increase the cooling parameter 220 by increasing a fan speed of the cooling module 206.

In some examples, when the cooling module 206 includes a liquid-cooled cooling module, the cooling module 206 can increase the cooling parameter 220 by increasing a flow rate of a liquid of the liquid-cooled cooling module. Specifically, liquid-cooled cooling modules can use a digital flow controller on a liquid loop. The liquid-cooled cooling modules can use an on/off solenoid value to duty cycle the liquid (coolant) flow, resulting in variable processor 208 cooling.

In some examples, the temperature management computing module 204 can set the operating temperature 250 of the processor 208 when the processor 208 is operating the minimal power. Continuing the example, the temperature management computing module 204 can provide instructions to the cooling module 206 to set the cooling parameter 220 to 60% such that the operating temperature 250 of the processor 208 is 68 degrees Celsius. As a result, the processor 208 is operating at the minimal power based on the temperature 250 of the processor—e.g., 123 watts.

In some examples, the temperature management computing module 204 can identify an operating temperature of the information handling system 202 wherein the information handling system 202 is operating at a minimal power.

Specifically, the temperature management computing module 204, in response to determining that the processor 208 is in the steady-state condition, can increase the cooling parameter 220 of the cooling module 206 to decrease the temperature 250 of the processor 208. Further in response to determining that the processor 208 is in the steady-state condition, the temperature management computing module 204 can determine, based on the decreased temperature 250 of the processor 208, whether the power used by the information handling system 202 has decreased. Further in response to determining that the processor 208 is in the steady-state condition, the temperature management computing module 204, when the power of the information handling system 202 has decreased, iteratively increases the cooling parameter 220 of the cooling module 206 until the power used by the information handling system 202 stops decreasing to identify the operating temperature of the information handling system 202 where the information handling system 202 is operating at a minimal power.

Figure 4:
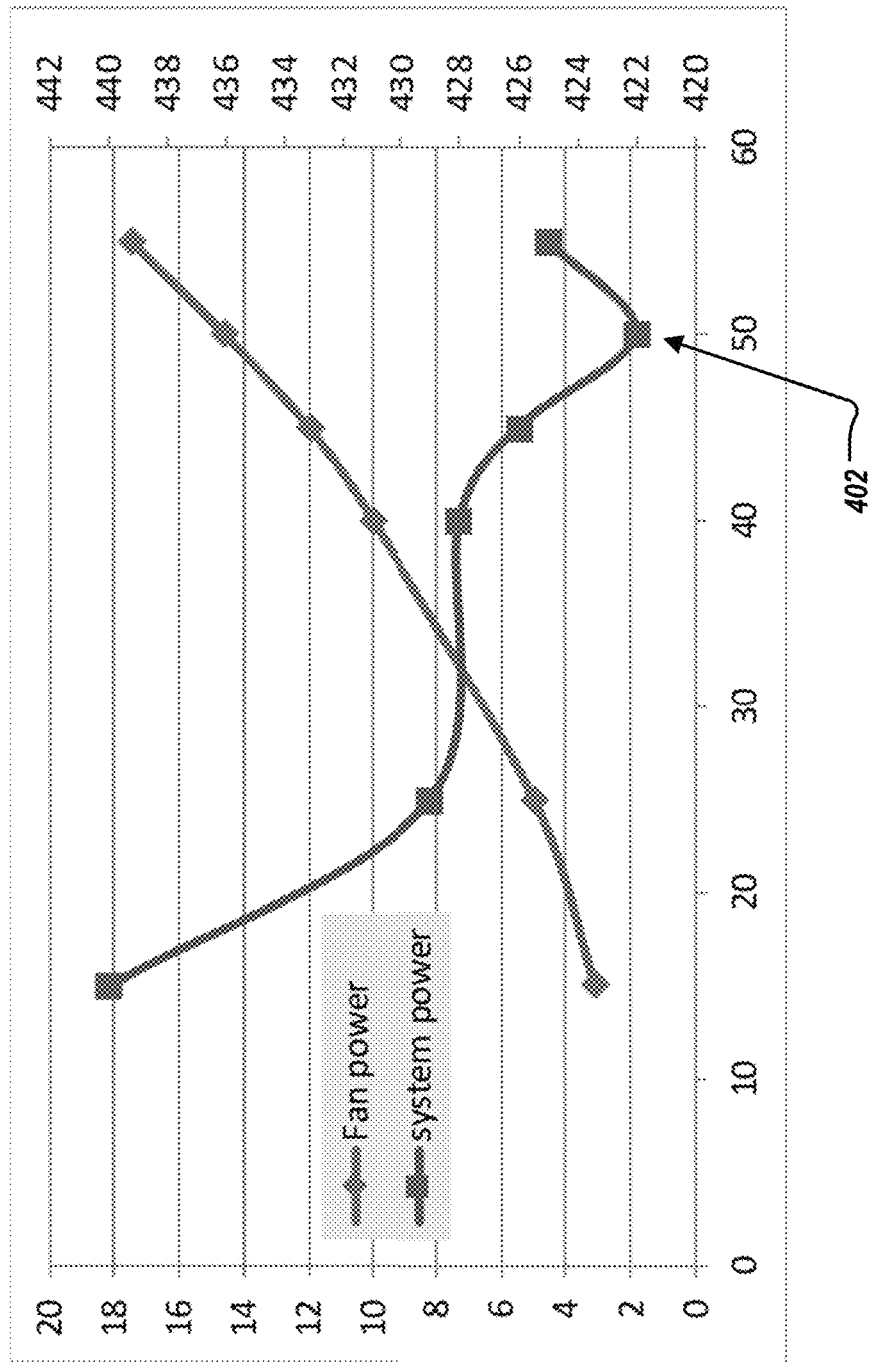
FIG. 4 illustrates a graph illustrating a relationship between values of a cooling parameter, a power of an information handling system, and a power of a cooling module.

FIG. 4 illustrates a graph 400 illustrating a relationship between the values of the cooling parameter 220, a power of the information handling system 202, and a power of the cooling module 206. In some examples, the power used by the information handling system can include the power used by the processor 208 and the power used by the cooling module 206. As described further below, the cooling module 206 includes an air-based cooling system (fan) but can include any type of cooling system.

Specifically, the x-axis illustrates the values of the cooling parameter 220 (e.g., fan speed in percentage of PWM), with the y-axis representing both the information handling system 202 power (watts) and fan power 260 (watts).

To that end, in some examples, as the cooling module 206 increases the cooling parameter 220, the power used by the cooling module 206 is increased. Furthermore, as the cooling module 206 increases the cooling parameter 220, the power used by the information handling system 202 is decreased, until an inflection point 402. Subsequent increase in the cooling parameter 220 can increase the power used by the information handling system 202. That is, as the power used by the information handling system 202 includes the power of the processor 208 and the power of the cooling module 206, further increases to the power used by the cooling module 206 (to reduce the temperature of the processor 208) can result in a higher gain in the power used by the cooling module 206 as compared to the decrease in the power used by the processor 208.

For example, as the cooling module 206 increases the cooling parameter 220 from 15% to 50%, the power used by the cooling module 206 increases from 3 watts to 14.2 watts. Additionally, as the cooling module 206 increases the cooling parameter 220 from 15% to 50%, the power used by the information handling system 202 decreases from 440 watts to 422 watts. This is a result in the decrease in the temperature 250 at the processor 208 resulting from the increase in the cooling parameter 220.

However, as the cooling module 206 increases the cooling parameter 220 from 50% to 55%, the power used by the cooling module 206 increase from 14.2 watts to 17.8 watts; and further, the power used by the information handling system 202 increases from 422 watts to 425 watts. This is a result of i) increased power 260 used by the processor 208 (as mentioned above with respect to FIG. 3) and/or ii) increased power used by the cooling module 206. Thus, the temperature management computing module 204 can identify the operating temperature 250 of the processor 208, and or the operating temperature of the information handling system 202, where the information handling system 202 is operating the minimal power. For example, the temperature management computing module 204 can identify the operating temperature 250 of the processor 208 wherein the information handling system 202 is operating at 422 watts.

Figure 5:
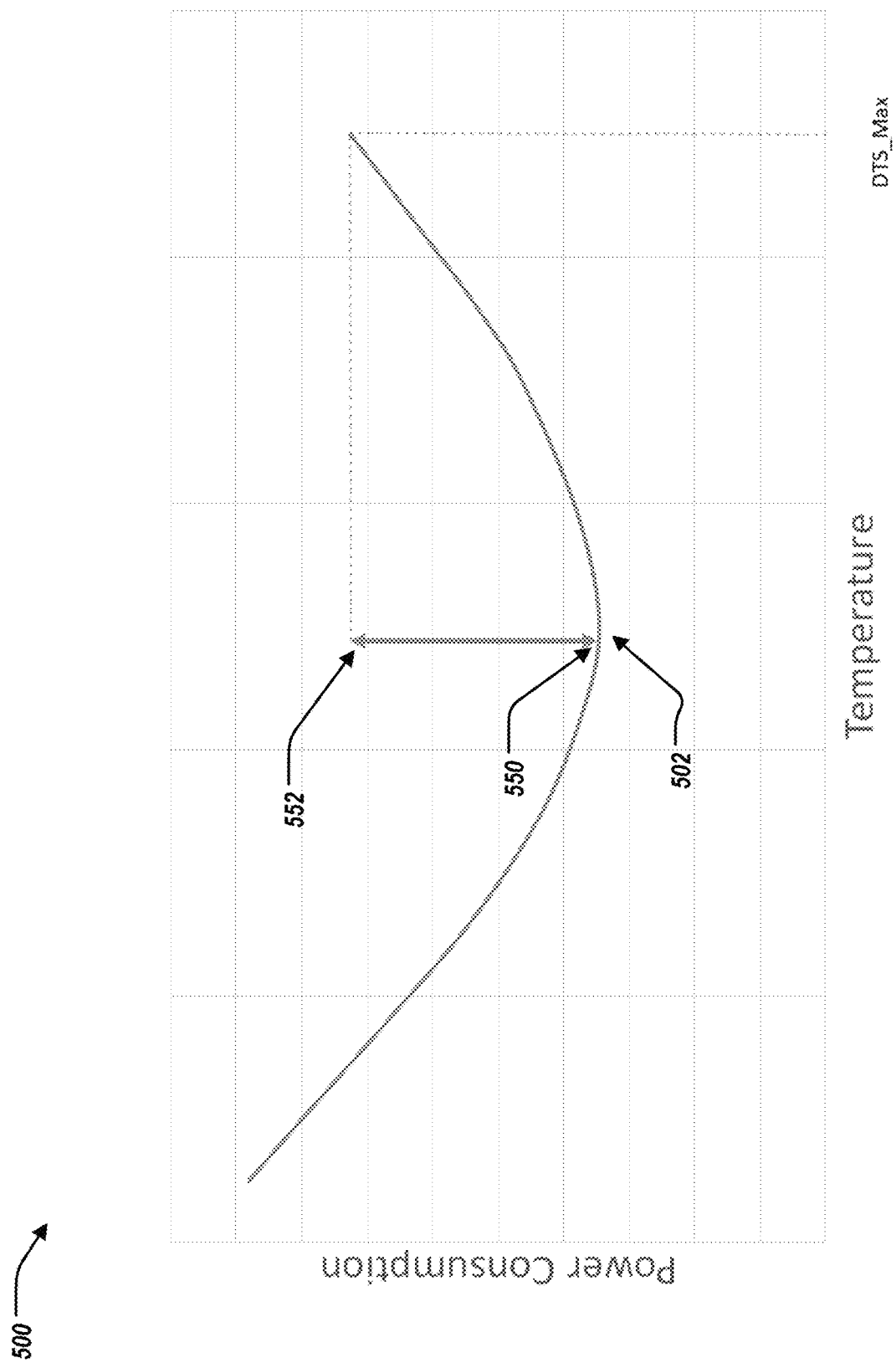
FIG. 5 illustrates a graph illustrating a power consumption curve of a processor in relation to the power of the processor.

FIG. 5 illustrates a graph 500 illustrating a power consumption curve of the processor 208 in relation to the power of the processor 208. Specifically, the temperature 250 of the processor 208 can range between a digital thermal sensor (DTS) maximum and minimum (e.g., as indicated by manufacturing specification of the processor 208). Similar to that mentioned above, the optimal temperature—the temperature 250 of the processor 208 where the processor 208 is operating at a minimal power—can be indicated by inflection point 502. To that end, by operating the processor 208 at the temperature indicated by inflection point 502, the processor 208 is able to, at a later time, perform at a higher temperature for a short amount of time ("burst" or "turbo") up to the DTS max to increase the performance of the processor 208 for the short amount of time, shown as the difference in power between points 550 and 552. Specifically, the processor 208 is able to operate at the DTS max temperature to increase the power consumption of the processor 208 for a short amount of time as the "average" power of the processor 208 can be within thermal design power specifications of the processor 208).

Figure 6:
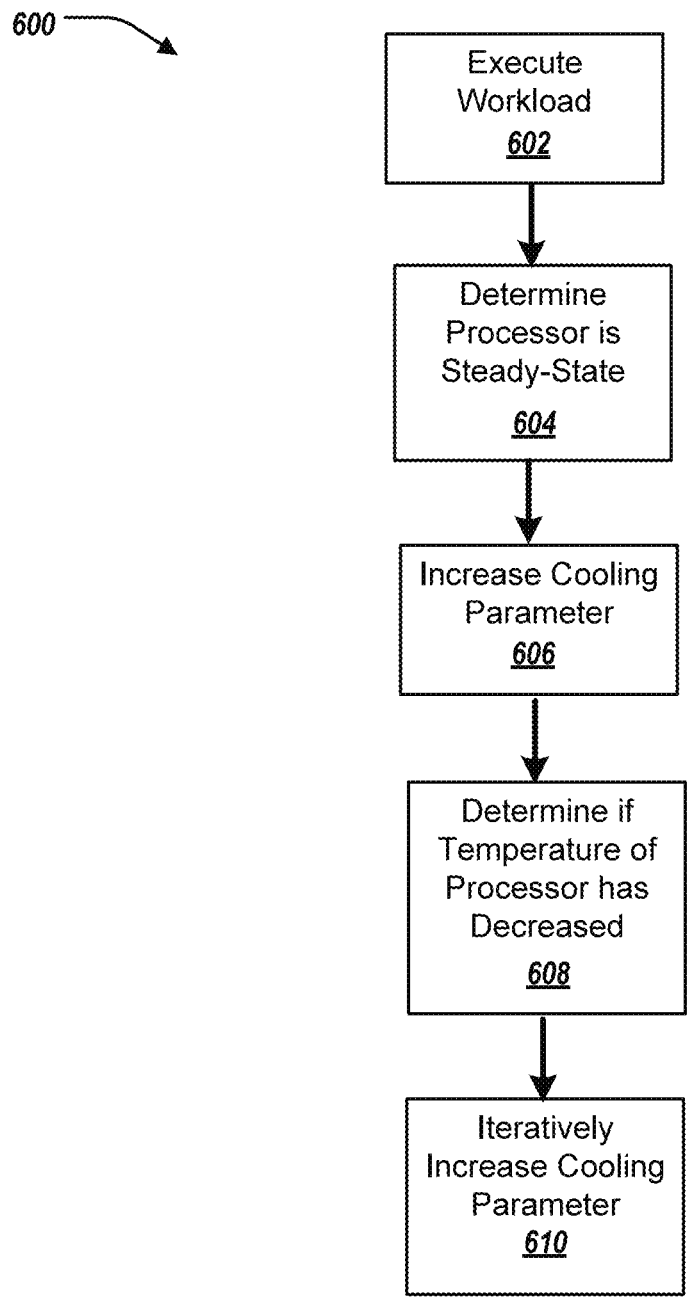
FIG. 6 a method for controlling an operating temperature of a processor to reduce power usage at the information handling system.

FIG. 6 illustrates a flowchart depicting selected elements of an embodiment of a method 600 for controlling an operating temperature of a processor to reduce power usage at an information handling system. The method 600 may be performed by the information handling system 100, the information handling system 202, the temperature management computing module 204, and/or the cooling module 206, and with reference to FIGS. 1-5. It is noted that certain operations described in method 600 may be optional or may be rearranged in different embodiments.

The processor 208 can execute a workload 210 (602). The temperature management computing module 204 can, in response to execution of the workload 210 by the processor 208, determine that the processor 208 is in a steady-state condition (604). The temperature management computing module 204, in response to determining that the processor 208 is in the steady-state condition, can increase the cooling parameter 220 of the cooling module 206 to decrease the temperature 250 of the processor 208 (606). Further in response to determining that the processor 208 is in the steady-state condition, the temperature management computing module 204 can determine, based on the decreased temperature 250 of the processor 208, whether the power 260 used by the processor 208 has decreased (608). Further in response to determining that the processor 208 is in the steady-state condition, the temperature management computing module 204, when the power 260 of the processor 208 has decreased, iteratively increasing the cooling parameter 220 of the cooling module 206 until the power 260 used by the processor 208 stops decreasing to identify the operating temperature of the processor 208 where the processor 208 is operating at a minimal power (610).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method to control an operating temperature of a processor of an information handling system, the method comprising:
  executing a workload by the processor at the information handling system;
  in response to execution of the workload, determining that the processor is in a steady-state condition;
  in response to determining that the processor is in the steady-state condition:
    increasing a cooling parameter of a cooling module of the information handling system to decrease a temperature of the processor;
    determining, based on the decreased temperature of the processor, whether a power used by the processor has decreased; and
    when the power used by the processor has decreased, iteratively increasing the cooling parameter of the cooling module until the power of the processor stops decreasing to identify the operating temperature of the processor where the processor is operating at a minimal power.

2. The method of claim 1, wherein increasing the cooling parameter of the cooling module includes increasing a fan speed of an air cooled cooling module.

3. The method of claim 1, wherein increasing the cooling parameter of the cooling module includes increasing a flow rate of a liquid of a liquid cooled cooling module.

4. The method of claim 1, wherein executing the workload includes setting one or more parameters of the processor, the parameters including a processor power, a processor power utilization, a processor operating frequency, and a processor workload type.

5. The method of claim 1, further comprising setting the operating temperature of the processor when the processor is operating at the minimal power.

6. The method of claim 1, wherein determining that the processor is in the steady-state condition includes identifying a steady-state temperature of the processor and a steady-state power of the processor.

7. The method of claim 6, further comprising, in response to execution of the workload, determining that the cooling module is in a steady state condition.

8. The method of claim 1, further comprising:
in response to determining that the processor is in the steady-state condition:
increasing a cooling parameter of the cooling module to decrease a temperature of the processor;
determining, based on the decreased temperature of the processor, whether the power used by the information handling system has decreased; and
when the power used by the information handling system has decreased, iteratively increasing the cooling parameter of the cooling module until the power of the information handling stops decreasing to identify an operating temperature of the information handling system where the information handling system is operating at a minimal power.

9. The method of claim 8, wherein the power of the information handling system includes the power of the processor and a power of the cooling module.

10. An information handling system comprising a processor having access to memory media storing instructions executable by the processor to perform operations comprising, comprising:
executing a workload by the processor at the information handling system;
in response to execution of the workload, determining that the processor is in a steady-state condition;
in response to determining that the processor is in the steady-state condition:
increasing a cooling parameter of a cooling module of the information handling system to decrease a temperature of the processor;
determining, based on the decreased temperature of the processor, whether a power used by the processor has decreased; and
when the power of the processor has decreased, iteratively increasing the cooling parameter of the cooling module until the power used by the processor stops decreasing to identify an operating temperature of the processor where the processor is operating at a minimal power.

11. The information handling system of claim 10, wherein increasing the cooling parameter of the cooling module includes increasing a fan speed of an air cooled cooling module.

12. The information handling system of claim 10, wherein increasing the cooling parameter of the cooling module includes increasing a flow rate of a liquid of a liquid cooled cooling module.

13. The information handling system of claim 10, wherein executing the workload includes setting one or more parameters of the processor, the parameters including a processor power, a processor power utilization, a processor operating frequency, and a processor workload type.

14. The information handling system of claim 10, the operations further comprising setting the operating temperature of the processor when the processor is operating at the minimal power.

15. The information handling system of claim 10, wherein determining that the processor is in the steady-state condition includes identifying a steady-state temperature of the processor and a steady-state power of the processor.

16. The information handling system of claim 15, the operations further comprising, in response to execution of the workload, determining that the cooling module is in a steady state condition.

17. The information handling system of claim 10, the operations further comprising:
in response to determining that the processor is in the steady-state condition:
increasing a cooling parameter of the cooling module to decrease a temperature of the processor;
determining, based on the decreased temperature of the processor, whether the power used by the information handling system has decreased; and
when the power of the information handling system has decreased, iteratively increasing the cooling parameter of the cooling module until the power used by the information handling stops decreasing to identify an operating temperature of the information handling system where the information handling system is operating at a minimal power.

18. The information handling system of claim 17, wherein the power of the information handling system includes the power of the processor and a power of the cooling module.

19. A non-transitory computer-readable medium storing software comprising instructions executable by one or more computers which, upon such execution, cause the one or more computers to perform operations comprising:
executing a workload by a processor at an information handling system;
in response to execution of the workload, determining that the processor is in a steady-state condition;
in response to determining that the processor is in the steady-state condition:
increasing a cooling parameter of a cooling module of the information handling system to decrease a temperature of the processor;
determining, based on the decreased temperature of the processor, whether a power used by the processor has decreased; and
when the power of the processor has decreased, iteratively increasing the cooling parameter of the cooling module until the power used by the processor stops decreasing to identify an operating temperature of the processor where the processor is operating at a minimal power.

20. The computer-readable medium of claim 19, wherein increasing the cooling parameter of the cooling module includes increasing a fan speed of an air cooled cooling module.

* * * * *